(12) United States Patent
Shimodaira

(10) Patent No.: US 8,014,628 B2
(45) Date of Patent: Sep. 6, 2011

(54) IMAGE INSPECTION APPARATUS, IMAGE INSPECTION METHOD AND COMPUTER PROGRAM

(75) Inventor: Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 453 days.

(21) Appl. No.: 12/352,739

(22) Filed: Jan. 13, 2009

(65) Prior Publication Data

US 2009/0202172 A1  Aug. 13, 2009

(30) Foreign Application Priority Data

Feb. 8, 2008  (JP) .................................. 2008-029514

(51) Int. Cl.
*G06K 9/40*  (2006.01)
(52) U.S. Cl. .......................... 382/275; 382/103; 382/209
(58) Field of Classification Search .................. 382/132, 382/103, 259, 308, 165, 224, 275
See application file for complete search history.

(56) References Cited

U.S. PATENT DOCUMENTS

| 2003/0228067 | A1* | 12/2003 | Miyake et al. | 382/275 |
| 2004/0247183 | A1* | 12/2004 | Molander | 382/209 |
| 2009/0074271 | A1* | 3/2009 | Nakamura et al. | 382/128 |
| 2010/0117990 | A1* | 5/2010 | Yahata | 345/175 |
| 2011/0103646 | A1* | 5/2011 | Zeller et al. | 382/103 |

FOREIGN PATENT DOCUMENTS

JP  06-083953  3/1994

* cited by examiner

*Primary Examiner* — Hoa Pham
(74) *Attorney, Agent, or Firm* — Kilyk & Bowersox, P.L.L.C.

(57) ABSTRACT

There is provided an image inspection apparatus capable of reliably removing a noise as a non-detection object and stably detecting a defect as a detection object, in which a first threshold setting device sets a minimum luminance value to be detected in a detection object image as a first threshold, a labeling processing device specifies blobs of pixels having luminance values larger than the first threshold from a multi-valued image acquired by an image pickup device, a second threshold setting device sets a second threshold that is larger than the first threshold, and a deletion device deletes the blob made up solely of luminance values smaller than the second threshold from all the blobs of the pixels specified by the labeling processing device and outputs the labeling processing image.

21 Claims, 8 Drawing Sheets

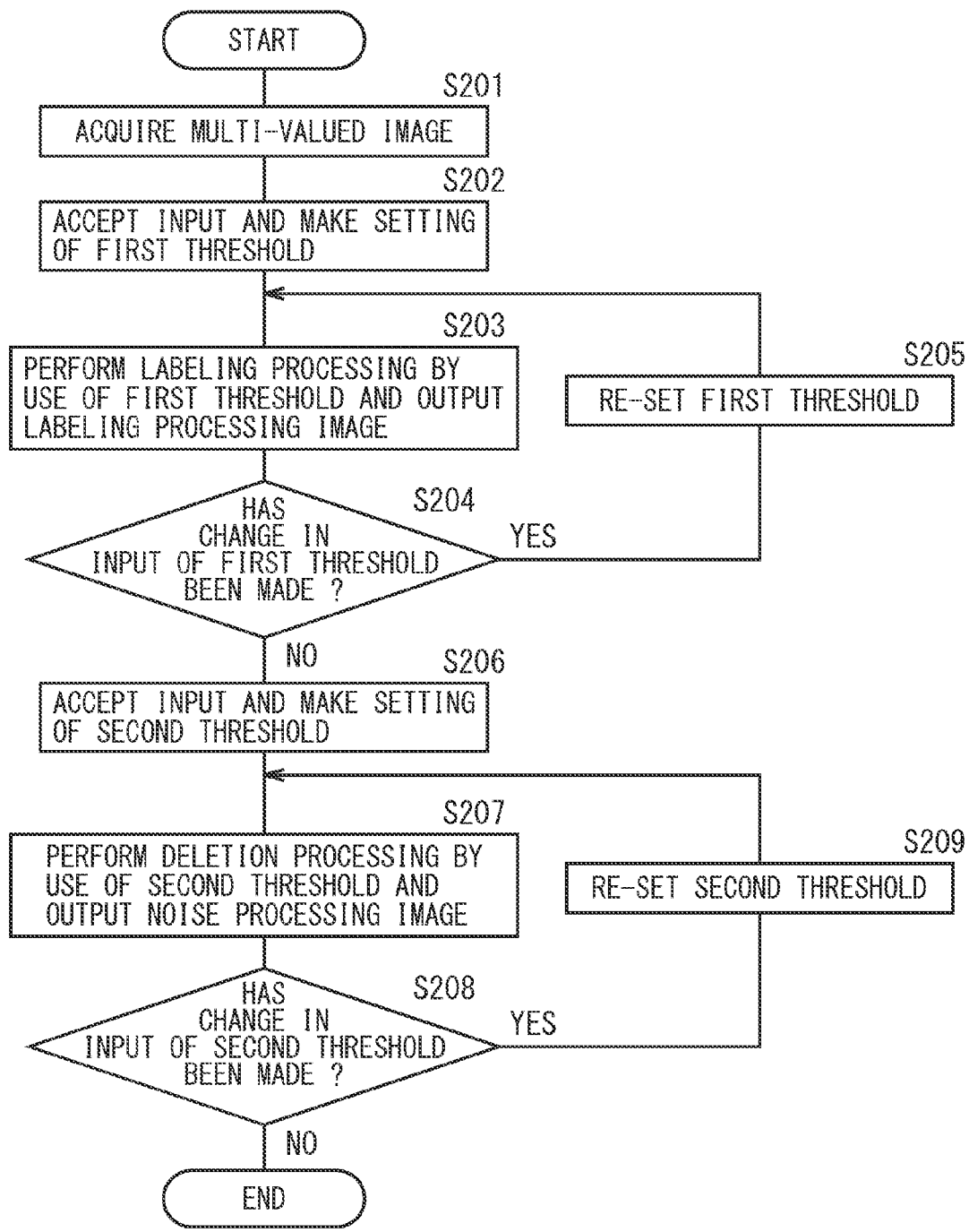
F I G. 2

F I G. 3
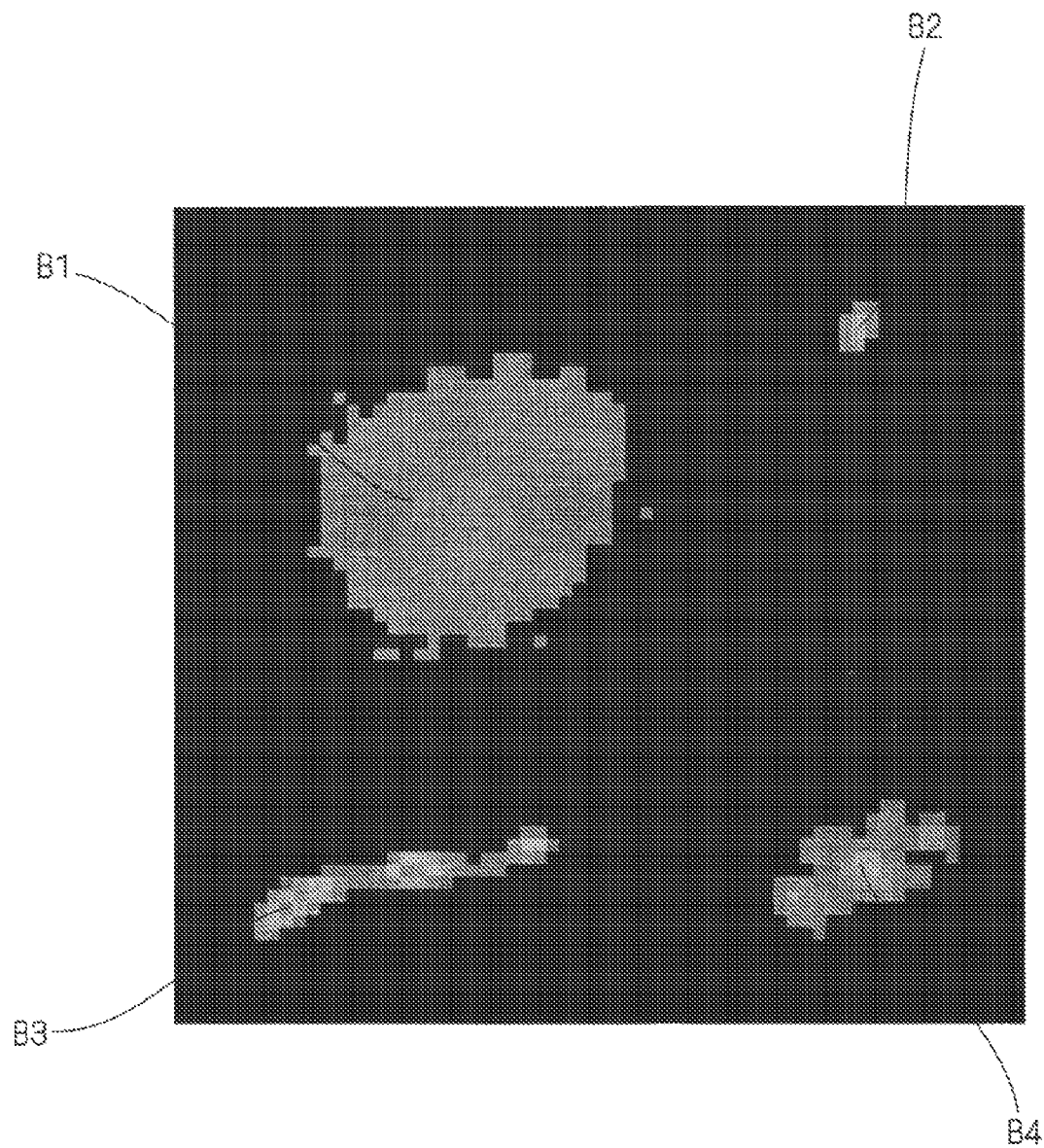

F I G. 4
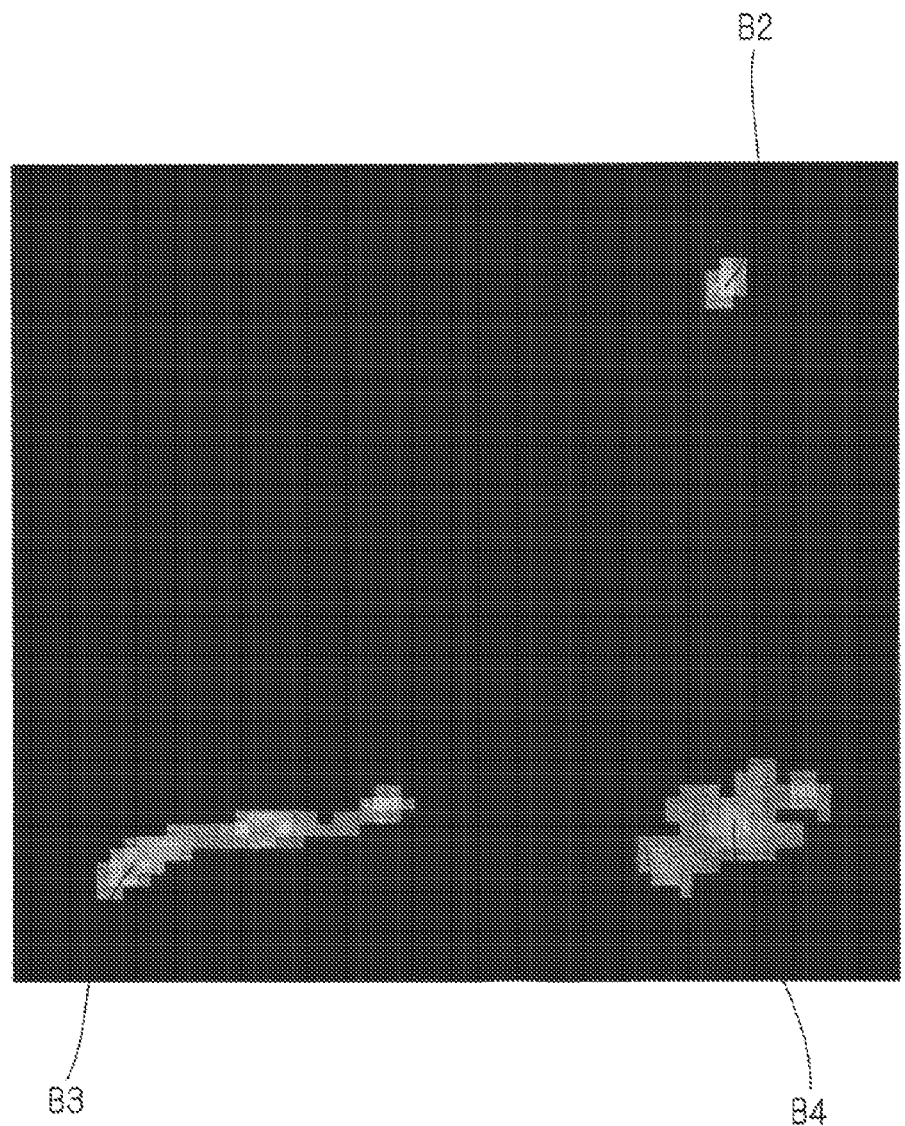

IMAGE INSPECTION APPARATUS, IMAGE INSPECTION METHOD AND COMPUTER PROGRAM

CROSS-REFERENCE TO RELATED APPLICATIONS

The present application claims foreign priority based on Japanese Patent Application No. 2008-029514, filed Feb. 8, 2008, the contents of which is incorporated herein by reference.

BACKGROUND OF THE INVENTION

1. Field of the Invention

The present invention relates to an image inspection apparatus and an image inspection method which are capable of removing a noise as a non-detection object from a multi-valued image acquired by picking up an image in an inspection object region, to inspect the presence or absence of a defect such as a scratch or a dirt, a size, a shape, and the like of a blob form as a detection object, and a computer program capable of executing each processing process of the image inspection method.

2. Description of the Related Art

As a conventional example, an image data processing apparatus has been proposed in which acquired multi-valued image data is binarized by one threshold and an image data after binarization is subjected to labeling processing, to remove as a noise a labeling-processed figure having the number of pixel not satisfying a prescribed number of pixels so that even a noise having a high luminance value can be removed in a case of the figure having a small area (refer to, e.g., Japanese Unexamined Patent Publication No. 06-083953). Hereinafter, an object wished to be ultimately detected is referred to as a detection object, and an object wished to be removed as a noise is referred to as a non-detection object.

SUMMARY OF THE INVENTION

However, in the above conventional example, although a non-detection object having an area smaller than that of the detection object can be deleted, a non-detection object having an area larger than that of the detection object cannot be deleted. In the conventional example, for the purpose of removing the non-detection object having the area larger than that of the detection object, a binarized threshold can be changed for the higher (or lower) than the maximum luminance value of the non-detection object for removal of the non-detection object, but when an image portion having a luminance value lower (or higher) than the luminance value of the non-detection object is present in luminance values of the detection object, there occurs a problem in that the figure of the detection object is segmented to prevent correct characteristics of the detection object from being obtained. In some cases, with the figure segmented, the detection object might not be distinguished from the non-detection object having a small area.

Further, in the above conventional example, the figure as the detection object has a small area, and in a case of a plurality of figures being present in block in a prescribed region, all of them are determined as noises and removed, whereby there has been a problem in that the plurality of object figures cannot be detected as one figure.

The present invention was made in view of the above problems, and its first object is to provide an image inspection apparatus, an image inspection method, and a computer program capable of executing each processing process of the image inspection method, the apparatus and the method being capable of reliably deleting as a noise a blob having a larger area as a non-detection object from a multi-valued image, and also detecting a blob as a detection object without segmentation thereof even when a luminance value lower (or higher) than a luminance value of the non-detection object wished to be removed as a noise is present within the blob as the detection object.

Further, in addition to the first object, a second object of the present invention is to improve blob determination ability such that, even in a case of a plurality of detection objects having small areas and being present in block in a prescribed region, the plurality of objects can be detected as one blob.

In order to achieve the above first object, an image inspection apparatus according to a first aspect of the present invention has a configuration including: an image pickup device for acquiring a multi-valued image in an inspection object region; a first threshold setting device for setting as a first threshold a minimum luminance value to be detected in a detection object image; a labeling processing device for performing labeling processing for extracting a plurality of pixels having luminance values larger than the first threshold from the multi-valued image acquired by the image pickup device, to specify blobs of the pixels based upon connectedness of the luminance values of the extracted plurality of pixels; a second threshold setting device for setting a second threshold larger than the first threshold with respect to the blobs of the pixels which are specified by the labeling processing device; and a deletion device for deleting the blob of the pixels which is made up solely of luminance values smaller than the second threshold set by the second threshold setting device.

With such a configuration, the first threshold setting device sets as a first threshold a minimum luminance value to be detected in a detection object image, the labeling processing device specifies all blobs of pixels including a non-detection object and a detection object which have luminance values larger than the first threshold, the second threshold setting device sets a second threshold larger than the first threshold, and the deletion device deletes the blob of the pixels which is made up solely of luminance values smaller than the second threshold from all the blobs of the pixels. It is thereby possible to reliably delete as a noise the blob having a large area and made up solely of luminance values smaller than the second threshold as the non-detection object from the multi-valued image, and also to detect the blob as the detection object without segmentation thereof even in a case where a portion having a low luminance value is present within the blob as the detection object.

An image inspection apparatus according to a second aspect of the present invention has a configuration including: an image pickup device for acquiring a multi-valued image in an inspection object region; a first threshold setting device for setting as a first threshold a maximum luminance value to be detected in a detection object image; a labeling processing device for performing labeling processing for extracting a plurality of pixels having luminance values smaller than the first threshold from the multi-valued image acquired by the image pickup device, to specify blobs of the pixels based upon connectedness of the luminance values of the extracted plurality of pixels; a second threshold setting device for setting a second threshold smaller than the first threshold with respect to the blobs of the pixels which are specified by the labeling processing device; and a deletion device for deleting the blob of the pixels which is made up solely of luminance values larger than the second threshold set by the second threshold setting device.

With such a configuration, the first threshold setting device sets as a first threshold a maximum luminance value to be detected in a detection object image, the labeling processing device specifies all blobs of pixels including a non-detection object and a detection object which have luminance values smaller than the first threshold, the second threshold setting device sets a second threshold smaller than the first threshold, and the deletion device deletes the blob of the pixels which is made up solely of luminance values larger than the second threshold from all the blobs of the pixels. It is thereby possible to reliably delete as a noise the blob having a large area and made up solely of luminance values larger than the second threshold as the non-detection object from the multi-valued image, and also to detect the blob as the detection object without segmentation thereof even in a case where a portion having a high luminance value is present within the blob as the detection object.

It is preferable to include in an image inspection apparatus according to a third aspect of the present invention in the first aspect, an input accepting device for accepting input of the first threshold and the second threshold.

With such a configuration, a user can freely input the first threshold and the second threshold with the input accepting device in accordance with luminance values of the blobs as the non-detection object and the detection object.

It is preferred that in an image inspection apparatus according to a fourth aspect of the present invention in the first aspect, the input accepting device be included which is for accepting input of the first threshold, and the second threshold setting device set as the second threshold a value obtained by adding a prescribed value to the first threshold.

With such a configuration, when the user wishes to detect only a blob having a luminance value difference not smaller than a prescribed value with respect to the first threshold inputted with the input accepting device, the second threshold is automatically set, which is convenient.

It is preferred that in an image inspection apparatus according to a fifth aspect of the present invention in the first aspect, the input accepting device be included which is for accepting input of the second threshold, and the first threshold setting device set as the first threshold a value obtained by subtracting a prescribed value from the second threshold.

With such a configuration, the user inputs the second threshold with the input accepting device and the blob having a luminance value larger than the inputted second threshold is detected, and when the user wishes to specify and detect the blob by use of the first threshold which is smaller than the second threshold by a prescribed value, the first threshold is automatically set, which is convenient.

It is preferred that in an image inspection apparatus according to a sixth aspect of the present invention in the second aspect, the input accepting device be included which is for accepting input of the first threshold, and the second threshold setting device set as the second threshold a value obtained by subtracting a prescribed value from the first threshold.

With such a configuration, when the user wishes to detect only a blob having a luminance value difference larger than a prescribed value with respect to the first threshold inputted with the input accepting device, the second threshold is automatically set, which is convenient.

It is preferred that in an image inspection apparatus according to a seventh aspect of the present invention in the second aspect the input accepting device be included which is for accepting input of the second threshold, and the first threshold setting device set as the first threshold a value obtained by adding a prescribed value to the second threshold.

With such a configuration, the user inputs the second threshold with the input accepting device and the blob having a luminance value larger than the inputted second threshold is detected, and when the user wishes to specify and detect the blob by use of the first threshold which is larger than the second threshold by a prescribed value, the first threshold is automatically set, which is convenient.

In order to achieve the second object, it is preferable to include in an image inspection apparatus according to an eighth aspect of the present invention in the third aspect, a segment setting device for setting a segment of a prescribed size with respect to the multi-valued image acquired by the image pickup device; and a segment image generating device for calculating a mean luminance value of pixels within the segment, while moving the segment set by the segment setting device in prescribed pixel units, to generate a segment image having the calculated mean luminance value and to output the generated image to the labeling processing device.

With such a configuration, while the segment of a prescribed size is moved in prescribed pixel units (moving amount), a segment image is generated with a mean luminance value of all pixels within the calculated segment as one pixel value, and processing using the two thresholds is performed on the segment image so that the detection object has a small area. Even when a plurality of objects are present in block in a prescribed region, the plurality of objects can be detected as one blob, thereby improving the blob determination ability.

It is preferred that in an image inspection apparatus according to a ninth aspect of the present invention in the eighth aspect, the prescribed pixel units for the prescribed size and the movement of the segment be accepted in the input accepting device.

With such a configuration, the user can freely set a size (the number of pixels in an X-direction and a Y-direction) and a moving amount (the number of pixels in the X-direction and the Y-direction) of the segment, to freely adjust an object wished to be detected as one blob.

An image inspection method according to a tenth aspect of the present invention has a configuration including: an image acquiring process for acquiring a multi-valued image by picking up an image in an inspection object region; a first threshold setting process for setting as a first threshold a minimum luminance value to be detected in a detection object image; a labeling processing process for performing labeling processing for extracting a plurality of pixels having luminance values larger than the first threshold from the multi-valued image acquired by the image acquiring process, to specify blobs of the pixels based upon connectedness of the luminance values of the extracted plurality of pixels; a second threshold setting process for setting a second threshold larger than the first threshold with respect to the blobs of the pixels which are specified by the labeling processing process; and a deletion process for deleting the blob of the pixels which is made up solely of luminance values smaller than the second threshold set by the second threshold setting process.

With such a configuration, in the first threshold setting process, a minimum luminance value to be detected in a detection object image is set as a first threshold. In the labeling processing process, blobs of pixels having luminance values larger than the first threshold are specified. In the second threshold setting process, a second threshold larger than the first threshold is set. In the deletion process, the blob of the pixels which is made up solely of luminance values smaller than the second threshold is deleted from all the blobs of the pixels. It is thereby possible to reliably delete as a noise the blob having a large area and made up solely of luminance values smaller than the second threshold as the non-detection object from the multi-valued image, and also to detect the blob as the detection object without segmentation thereof even in a case where a portion having a low luminance value is present within the blob as the detection object.

An image inspection method according to an eleventh aspect of the present invention has a configuration including: an image acquiring process for acquiring a multi-valued image by picking up an image in an inspection object region; a first threshold setting process for setting as a first threshold a maximum luminance value to be detected in a detection object image; a labeling processing process for performing labeling processing for extracting a plurality of pixels having luminance values smaller than the first threshold from the multi-valued image acquired by the image acquiring process, to specify blobs of the pixels based upon connectedness of the luminance values of the extracted plurality of pixels; a second threshold setting process for setting a second threshold smaller than the first threshold with respect to the blobs of the pixels which are specified by the labeling processing process; and a deletion process for deleting the blob of the pixels which is made up solely of luminance values larger than the second threshold set by the second threshold setting process.

With such a configuration, in the first threshold setting process, a maximum luminance value to be detected in a detection object image is set as a first threshold. In the labeling processing process, blobs of pixels having luminance values smaller than the first threshold are specified. In the second threshold setting process, a second threshold smaller than the first threshold is set. In the deletion process, the blob of the pixels which is made up solely of luminance values larger than the second threshold is deleted from all the blobs of the pixels. It is thereby possible to reliably delete as a noise the blob having a large area and made up solely of luminance values larger than the second threshold as the non-detection object from the multi-valued image, and also to detect the blob as the detection object without segmentation thereof even in a case where a portion having a high luminance value is present within the blob as the detection object.

It is preferable to include in an image inspection method according to a twelfth aspect of the present invention in the tenth aspect, an input accepting process for accepting input of the first threshold and the second threshold.

With such a configuration, the user can freely input the first threshold and the second threshold in the input accepting process in accordance with luminance values of the blobs as the non-detection object and the detection object.

It is preferred that in an image inspection method according to a thirteenth aspect of the present invention in the tenth aspect, the input accepting process be included which is for accepting input of the first threshold, and the second threshold setting process set as the second threshold a value obtained by adding a prescribed value to the first threshold.

With such a configuration, when the user wishes to detect only a blob having a luminance value difference not smaller than a prescribed value with respect to the first threshold inputted in the input accepting process, the second threshold is automatically set, which is convenient.

It is preferred that in an image inspection method according to a fourteenth aspect of the present invention in the tenth aspect, the input accepting process be included which is for accepting input of the second threshold, and the first threshold setting process set as the first threshold a value obtained by subtracting a prescribed value from the second threshold.

With such a configuration, the user inputs the second threshold in the input accepting process and the blob having a luminance value larger than the inputted second threshold is detected, and when the user wishes to specify and detect the blob by use of the first threshold which is smaller than the second threshold by a prescribed value, the first threshold is automatically set, which is convenient.

It is preferred that in an image inspection method according to a fifteenth aspect of the present invention in the eleventh aspect, the input accepting process be included which is for accepting input of the first threshold, and the second threshold setting process set as the second threshold a value obtained by subtracting a prescribed value from the first threshold.

With such a configuration, when the user wishes to detect only a blob having a luminance value difference larger than a prescribed value with respect to the first threshold inputted in the input accepting process, the second threshold is automatically set, which is convenient.

It is preferred that in an image inspection method according to a sixteenth aspect of the present invention in the eleventh aspect, the input accepting process be included which is for accepting input of the second threshold, and the second threshold setting process set as the first threshold a value obtained by adding a prescribed value to the second threshold.

With such a configuration, the user inputs the second threshold in the input accepting process and the blob having a luminance value larger than the inputted second threshold is detected, and when the user wishes to specify and detect the blob by use of the first threshold increased from the second threshold by a prescribed value, the first threshold is automatically set, which is convenient.

In order to achieve the second object, it is preferable to include in an image inspection method according to a seventeenth aspect of the present invention in the twelfth aspect, a segment setting process for setting a segment of a prescribed size with respect to the multi-valued image acquired by the image acquiring process; and a segment image generating process for calculating a mean luminance value of pixels within the segment, while moving the segment set by the segment setting process in prescribed pixel units, to generate a segment image having the calculated mean luminance value and to output the generated image to the labeling processing process.

With such a configuration, while the segment of a prescribed size is moved in pixel units, a segment image is generated with a mean luminance value of all pixels within the calculated segment as one pixel value, and processing using the two thresholds is performed on the segment image so that the detection object has a small area. Even when a plurality of objects are present in block in a prescribed region, the plurality of objects can be detected as one blob, thereby improving the blob determination ability.

It is preferred that in an image inspection method according to an eighteenth aspect of the present invention in the seventeenth aspect, the prescribed pixel units for the prescribed size and the movement of the segment be accepted in the input accepting process.

With such a configuration, the user can freely set a size (the number of pixels in the X-direction and the Y-direction) and a moving amount (the number of pixels in the X-direction and the Y-direction) of the segment, to freely adjust an object wished to be detected as one blob.

A computer program according to a nineteenth aspect of the present invention has a configuration to cause a computer to execute: image acquiring processing for picking up an image in an inspection object region to acquire a multi-valued image; first threshold setting processing for setting as a first threshold a minimum luminance value to be detected in a detection object image; labeling processing for extracting a plurality of pixels having luminance values larger than the first threshold from the multi-valued image acquired by the image acquiring processing, to specific blobs of the pixels based upon connectedness of the luminance values of the extracted plurality of pixels; first determination processing for determining, after the performance of the labeling processing, whether or not a request has been made for a change in setting of the first threshold; first threshold re-setting processing for re-setting the first threshold upon determination by the first determination processing that the request has been made for a change in setting of the first threshold; first branch processing for branching the processing to the labeling processing in the case of the first threshold re-setting processing being performed; second threshold setting processing for setting a second threshold larger than the first threshold with respect to the blobs of the pixels which are specified by the labeling processing; deletion processing for deleting the blob of the pixels which is made up solely of luminance values smaller than the second threshold set by the second threshold setting processing; second determination processing for determining, after the performance of the deletion processing, whether or not a request has been made for a change in setting of the second threshold; second threshold re-setting processing for re-setting the second threshold upon determination by the second determination processing that the request has been made for a change in setting of the second threshold; and second branch processing for branching the processing to the deletion processing in the case of the second threshold re-setting processing being performed.

With such a configuration, it is possible to reliably delete as a noise the blob having a large area and made up solely of luminance values smaller than the second threshold as the non-detection object from the multi-valued image, while changing the setting of the first threshold and/or the second threshold, and also to detect the blob as the detection object without segmentation thereof even in a case where a portion having a low luminance value is present within the blob as the detection object.

A computer program according to a twentieth aspect of the present invention has a configuration to cause a computer to execute: image acquiring processing for picking up an image in an inspection object region to acquire a multi-valued image; first threshold setting processing for setting as a first threshold a maximum luminance value to be detected in a detection object image; labeling processing for extracting a plurality of pixels having luminance values smaller than the first threshold from the multi-valued image acquired by the image acquiring processing, to specify blobs of the pixels based upon connectedness of the luminance values of the extracted plurality of pixels; first determination processing for determining, after the performance of the labeling processing, whether or not a request has been made for a change in setting of the first threshold; first threshold re-setting processing for re-setting the first threshold upon determination by the first determination processing that the request has been made for a change in setting of the first threshold; first branch processing for branching the processing to the labeling processing in the case of the first threshold re-setting processing being performed; second threshold setting processing for setting a second threshold smaller than the first threshold with respect to the blobs of the pixels which are specified by the labeling processing; deletion processing for deleting the blob of the pixels which is made up solely of luminance values larger than the second threshold set by the second threshold setting processing; second determination processing for determining, after the performance of the deletion processing, whether or not a request has been made for a change in setting of the second threshold; second threshold re-setting processing for re-setting the second threshold upon determination by the second determination processing that the request has been made for a change in setting of the second threshold; and second branch processing for branching the processing to the deletion processing in the case of the second threshold re-setting processing being performed.

With such a configuration, it is possible to reliably delete as a noise the blob having a large area and made up solely of luminance values smaller than the second threshold as the non-detection object from the multi-valued image, while changing the setting of the first threshold and/or the second threshold, and also to detect the blob as the detection object without segmentation thereof even in a case where a portion having a high luminance value is present within the blob as the detection object.

In the nineteenth aspect, a computer program according to a twenty-first aspect of the present invention preferably further causes a computer to execute: segment setting processing for setting a segment of a prescribed size with respect to the multi-valued image acquired by the image acquiring processing; segment image generating processing for calculating a mean luminance value of pixels within the segment, while moving the segment set by the segment setting processing in prescribed pixel units, to generate a segment image having the calculated mean luminance value and make the generated image an object for the labeling processing; third determination processing for determining, after the performance of the segment image generating processing, whether or not a request has been made for a change in setting of the pixel units for the size and/or the movement of the segment; segment re-setting processing for re-setting the pixel units for the size and/or the movement of the segment upon determination by the third determination processing that the request has been made for a change in setting of the pixel units for the size and/or the movement of the segment; and third branch processing for branching the processing to the segment image generating processing in the case of the segment re-setting processing being performed.

With such a configuration, while the segment of a prescribed size is moved in pixel units, a segment image is generated with a mean luminance value of all pixels within the calculated segment as one pixel value, and processing using the two thresholds is performed on the segment image so that the detection object has a small area. Even when a plurality of objects are present in block in a prescribed region, the plurality of objects can be detected as one blob, thereby improving the blob determination ability.

According to the present invention, it is possible to provide an image inspection apparatus, an image inspection method, and a computer program capable of executing each processing process of the image inspection method, the apparatus and the method being capable of reliably deleting as a noise a blob having a larger area as a non-detection object from a multi-valued image, and also detecting a blob as a detection object without segmentation thereof even when a luminance value lower (or higher) than a luminance value of the non-detection object wished to be removed as a noise is present within the blob as the detection object.

Further, according to the present invention, in addition to the above advantages, it is possible to improve the blob determination ability such that, even in the case of a plurality of detection objects having small areas and being present in block in a prescribed region, the plurality of objects can be detected as one blob. It is to be noted that, even when a plurality of pixels having luminance values smaller (larger) than the first threshold are extracted from the multi-valued image acquired by the image acquiring processing and the blob of pixels made up solely of luminance values larger (smaller) than the set second threshold is deleted in place of extracting a plurality of pixels having luminance values smaller (larger) than the first threshold from the multi-valued image acquired by the image acquiring processing and deleting the blob of pixels made up solely of luminance values larger (smaller) than the set second threshold, similar advantages can be expected.

BRIEF DESCRIPTION OF THE DRAWINGS

FIG. 2 is a flowchart showing each processing process in an image inspection method according to the first embodiment of the present invention;

FIG. 3 is a view showing an example of display screens of a labeling processing image according to the first embodiment of the present invention;

FIG. 4 is a view showing an example of display screens of a noise processing image according to the first embodiment of the present invention;

DETAILED DESCRIPTION OF THE PREFERRED EMBODIMENTS

Embodiments of the present invention are described below with reference to the drawings. It is to be noted that elements having the same or similar configurations or functions through the drawings referenced in description of each embodiment are provided with the same or similar numerals, and the detailed descriptions thereof will not be given.

First Embodiment

Figure 1:
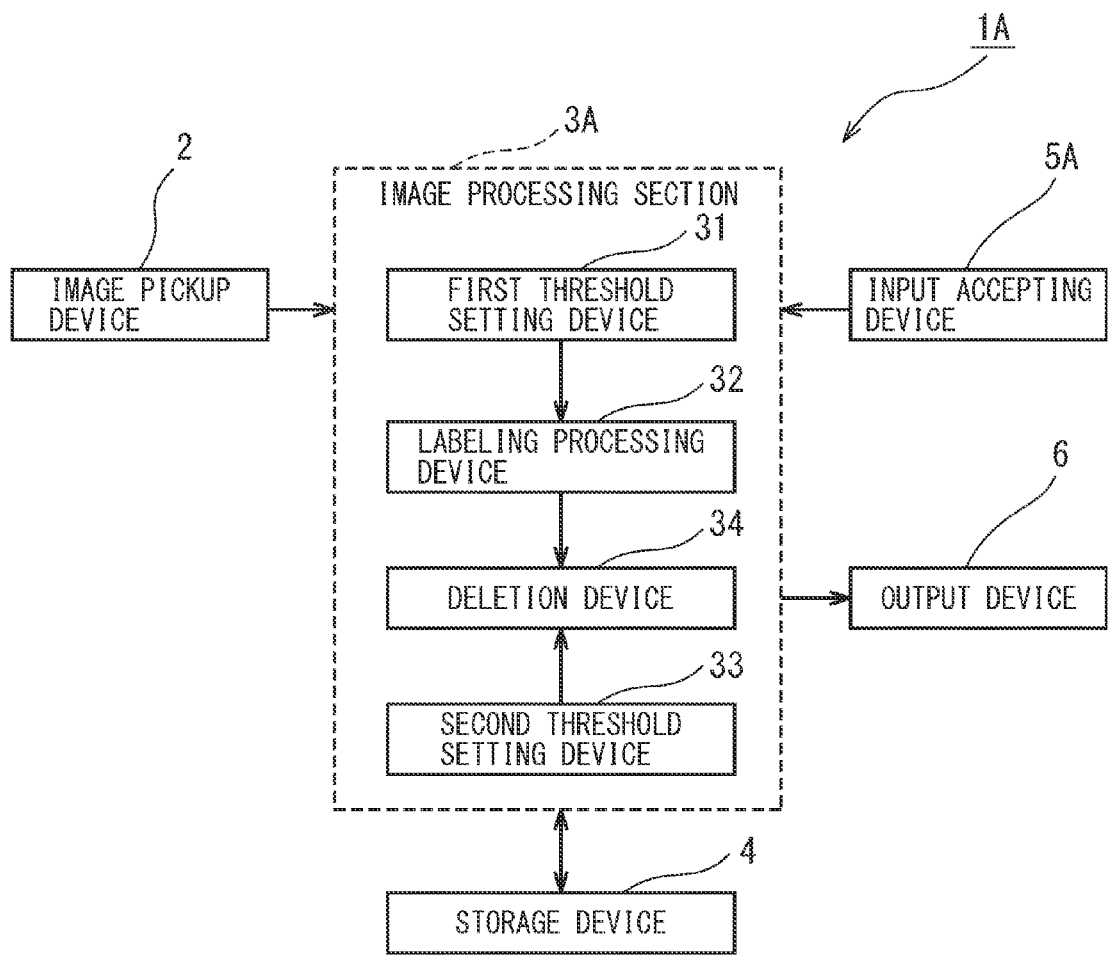
FIG. 1 is a block diagram showing a constitutional example of an image inspection apparatus according to a first embodiment of the present invention.

FIG. 1 is a block diagram showing a constitutional example of an image inspection apparatus according to a first embodiment of the present invention. In FIG. 1, an image inspection apparatus 1A according to the present first embodiment is configured of an image pickup device 2, an image processing section 3A, a storage device 4, an input accepting device 5A, and an output device 6.

The image pickup device 2 functions as, for example, a two-dimensional CCD camera, and for example, picks up an image of a work (inspection object region) on a film to acquire a multi-valued image, and outputs the image to the image processing section 3A.

The image processing section 3A includes a first threshold setting device 31, a labeling processing device 32, a second threshold setting device 33, and a deletion device 34. Further, the image processing section 3A is made up of a CPU, a ROM, a RAM, an external I/F, and the like, and controls processing operations of the first threshold setting device 31, the labeling processing device 32, the second threshold setting device 33, and the deletion device 34.

In advance of selection of a later described threshold by use of the first threshold setting device 31, the user is made to make a selection with a graphical user interface, not shown, as to whether or not to adopt a mode satisfying either condition: (Mode 1) a case where there is a possibility that a luminance value, which is lower than a luminance value of a non-detection object wished to be removed as a noise, is present within a blob as a detection object (the blob inside is totally made up of luminance values higher than those in the background); or (Mode 2) a case where there is a possibility that a luminance value, which is higher than the luminance value of the non-detection object wished to be removed as a noise, is present within the blob as the detection object (the blob inside is totally made up of luminance values lower than those in the background).

Upon receipt of a first threshold accepted by the input accepting device 5A from the user, the first threshold setting device 31 sets the first threshold with respect to the labeling processing device 32. As the first threshold, the user selects a minimum luminance value Lmin or a maximum luminance value Lmax, which are wished to be detected as the user, from luminance values present in an image to be detected.

More specifically, switching is automatically made such that, the input accepting device 5A accepts input of the minimum luminance value Lmin wished to be detected when Mode 1 is selected, and the input accepting device 5A accepts input of the maximum luminance value Lmax wished to be detected when Mode 2 is selected.

In the case of detecting a blob having luminance values higher than the first threshold, namely in the case of selecting Mode 1, the set first threshold is expressed as "TH1 (Lmin)". In the case of detecting a blob having luminance values lower than the first threshold, namely in the case of selecting Mode 2, the set first threshold is expressed as "TH1 (Lmax)".

It is to be noted that as a method for selecting Mode 1 or Mode 2, it is possible to simultaneously set "larger" or "smaller" at the time of setting the first threshold described above.

The labeling processing device 32 performs labeling processing for extracting a plurality of pixels having luminance values larger than the TH1 (Lmin) or smaller than TH1 (Lmax) from the multi-valued image acquired by the image pickup device 2, to specify aggregates (hereinafter referred to as blobs) of the pixels based upon connectedness of the luminance values of the extracted plurality of pixels, and outputs the labeling processing image.

Upon receipt of a second threshold accepted by the input accepting device 5A from the user, the second threshold setting device 33 sets a second threshold TH2 (Lmin) or TH2 (Lmax) with respect to the deletion device 34. More specifically, the second threshold TH2 (Lmin) is set in foregoing Mode 1, and TH2 (Lmax) is set in Mode 2. Here, the second threshold TH2 (Lmin) is larger than the first threshold TH1 (Lmin), and the second threshold TH2 (Lmax) is smaller than the first threshold TH1 (Lmax).

The deletion device 34 deletes the blob made up solely of luminance values smaller than the second threshold TH2 (Lmin) or larger than TH2 (Lmax), which was set by the second threshold setting device 33, from all the blobs specified by the labeling processing device 32, and outputs the noise processing image.

The storage device 4 functions as an image memory and stores, as needed, a multi-valued image picked up by the image pickup device 2, a labeling processing image obtained by the labeling processing device 32 and a noise processing image obtained by the deletion device 34. The input accepting device 5A accepts input of the first threshold TH1 (Lmin) or TH1 (Lmax), and the second threshold TH2 (Lmin) or TH2 (Lmax) from the user. The output device 6 functions as an image display apparatus, and displays a multi-valued image, a labeling processing image or a noise processing image on a screen.

FIG. 2 is a flowchart showing each processing process of the image inspection method according to the present invention which is used in the image inspection apparatus 1A according to the present first embodiment. Each processing process of the image inspection method according to the present invention is executed in accordance with the computer program according to the present invention which is stored inside the image processing section 3A.

In FIG. 2, first, the image processing section 3A acquires a multi-valued image of an inspection object region by image pickup in image acquiring processing (step S201). Next, the image processing section 3A accepts a user's input of the first threshold in input accepting processing, and sets a first threshold inputted by the user with respect to the labeling processing in first threshold setting processing (step S202).

Next, the image processing section 3A performs labeling processing by use of the first threshold set by the first threshold setting processing, and outputs a labeling processing image obtained as a result (step S203). The labeling processing image is displayed on the screen, and the user checks the display image and determines whether or not to change the first threshold. This determination by the user is made based upon whether or not all blobs (noises) as non-detection objects and blobs (defects) as detection objects are displayed on the screen.

Next, the image processing section 3A determines whether or not a change in input of the first threshold by the user has been made, from a result of the input accepting processing (whether or not a request for a change in setting of the first threshold has been made) (step S204). In the case of the change in input of the first threshold having been made (step S204: YES), the image processing section 3A re-sets the first threshold in first threshold re-setting processing (step S205), and returns the processing to step S203.

FIG. 3 is a view showing an example of a display screen of the labeling processing image. On the screen of FIG. 3, four blobs, blobs B1 and B2 as non-detection objects and blobs B3 and B4 as detection objects are displayed as the labeling processing image. In this example, the first threshold TH1 (Lmin) is used for the labeling processing. The blob B1 as the non-detection object has a large area and is made up of pixels uniformly having low luminance values. The blob B2 as the non-detection object has a small area and is made up of pixels partially having high luminance values. The blobs B3 and B4 as the detection objects are made up of pixels having a plurality of low luminance values and a plurality of high luminance values. It is to be noted that in the blob, a shaded portion shows pixels having high luminance values and a non-shaded portion shows pixels having low luminance values.

As shown in FIG. 3, when all blobs B1 to B4 are detected and the image processing section 3A determines that the change in input of the first threshold has not been made by the user (step S204: NO), the image processing section 3A accepts a user's input of a second threshold in the input accepting processing, and sets the second threshold inputted by the input accepting processing with respect to deletion processing in the second threshold setting processing (step S206).

Next, the image processing section 3A performs deletion processing by the second threshold set by the second threshold setting processing, and outputs a noise processing image obtained by the deletion processing (step S207). The noise processing image is displayed on the screen, and the user checks the display image and determines whether or not to change the second threshold. This determination by the user is made based upon whether or not only the blobs (defects) as detection objects are displayed on the screen.

Next, the image processing section 3A determines whether or not a change in input of the second threshold by the user has been made, from a result of the input accepting processing (whether or not a request for a change in setting of the second threshold has been made) (step S208). In the case of the change in input of the second threshold having been made (step S208: YES), the image processing section 3A re-sets the second threshold in second threshold re-setting processing (step S209), and returns the processing to step S207.

FIG. 4 is a view showing an example of display screens of the noise processing image. On the screen of FIG. 4, the blob B2 as the non-detection object and blobs B3 and B4 as the detection objects are displayed as the noise processing image. In FIG. 4, the blob B1 as the non-detection object, displayed in FIG. 3, has been deleted by the deletion processing since being made up only of luminance values smaller than the second threshold TH2 (Lmin). The blob B2 as the non-detection object remains since partially having high luminance values, but it has a small area, and hence setting a lower limit of the area by use of, for example, an area filter can delete the blob B2 as a noise. The blobs B3, B4 as the detection objects partially having a plurality of low luminance values can be detected without being segmented.

As shown in FIG. 4, the blob B1 as the non-detection object having a large area has been deleted as a noise, the blob B2 as the non-detection object having a small area can be removed as a noise by the processing using the area filter, and the blobs B3 and B4 as the detection objects are stably detected. When the image processing section 3A determines that the change in input of the second threshold by the user has not been made (step S208: NO), the processing is completed.

As described above, according to the first embodiment of the present invention, blobs as non-detection objects and detection objects having luminance values larger than the first threshold TH1 (Lmin) or smaller than TH1 (Lmax) are specified by the labeling processing, and a blob as the non-detection object having a large area and made up solely of luminance values smaller than the second threshold TH2 (Lmin) or larger than the second threshold TH2 (Lmax) is deleted by the deletion processing as a noise from all blobs specified by the labeling processing. It is thereby possible to detect a blob as a detection object without segmentation thereof even in a case where a portion with low luminance values is present within the blob as the detection object.

Second Embodiment

Figure 5:
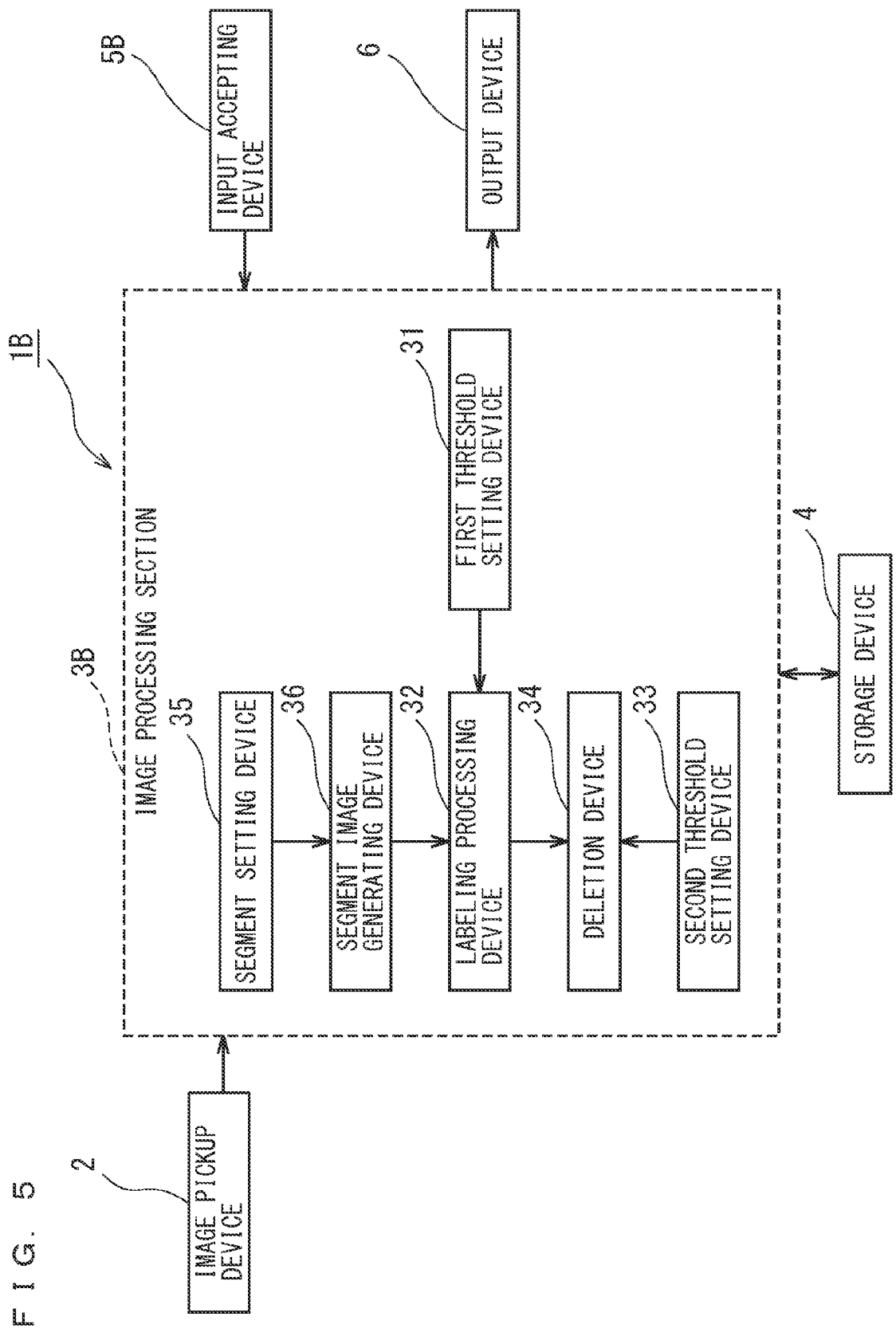
FIG. 5 is a block diagram showing a constitutional example of an image inspection apparatus according to a second embodiment of the present invention.

FIG. 5 is a block diagram showing a constitutional example of an image inspection apparatus according to a second embodiment of the present invention. In FIG. 5, an image inspection apparatus 1B according to the present second embodiment is configured of an image pickup device 2, an image processing section 3B, a storage device 4, an input accepting device 5B, and an output device 6.

It is to be noted that the present second embodiment is different from the first embodiment in that a segment setting device 35 and a segment image generating device 36 are added to the image processing section 3A of the first embodiment to configure the image processing section 3B, and that the input accepting device 5B accepts input of a size and a moving amount of a segment in addition to the first threshold and the second threshold. A description is made mainly on this difference below.

The segment setting device 35 sets, with respect to the segment image generating device 36, a segment of a size (the number of pixels in the X-direction and the number of pixels in the Y-direction) desired by the user which was inputted from the input accepting device 5B into a multi-valued image acquired by the image pickup device 2.

The segment image generating device 36 calculates a mean luminance value of pixels within the segment, while moving the segment of the size set by the segment setting device 35 in pixel units desired by the user (moving amount: the number of pixels in the X-direction and the number of pixel in the Y-direction), and generates a segment image having the calculated mean luminance value. Here, since the segment image is outputted to the image display apparatus serving as the output device 6 and displayed on the screen of the image display apparatus, the user can adjust the size and the moving amount of the segment, while checking the segment image.

Figure 6:
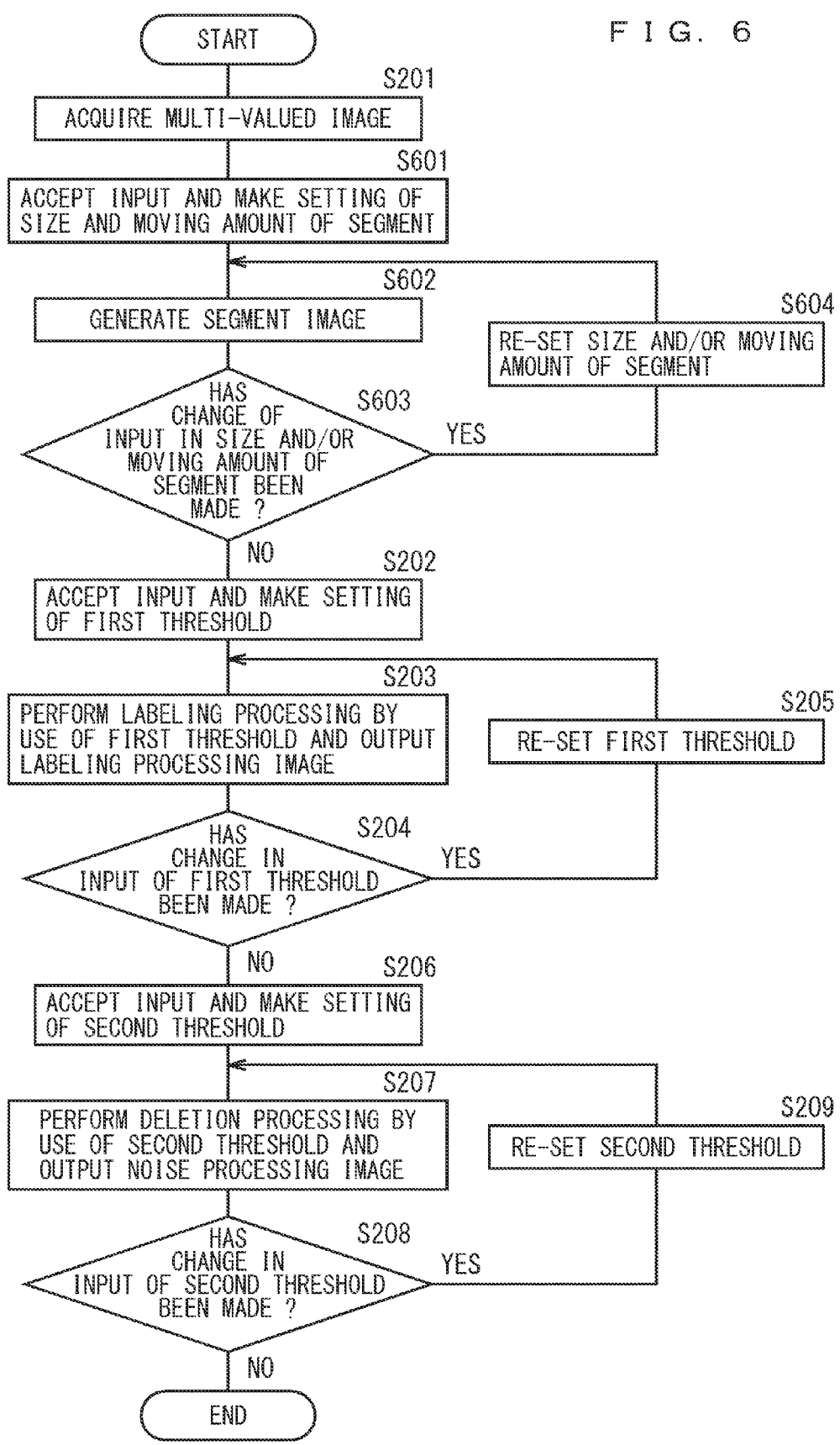
FIG. 6 is a flowchart showing each processing process in an image inspection method according to the second embodiment of the present invention.

FIG. 6 is a flowchart showing each processing process of an image inspection method according to the present invention which is used in the image inspection apparatus 1B according to the present second embodiment. Each processing process according to the image inspection method of the present invention is executed in accordance with the computer program according to the present invention which is stored inside the image processing section 3B.

In FIG. 6, first, the image processing section 3B acquires a multi-valued image of an inspection object region by image pickup in image acquiring processing (step S201). Next, the image processing section 3B accepts user's input of a size and a moving amount of a segment in input accepting processing and sets the size and the moving amount of a segment inputted by the user with respect to segment image generating processing in the segment setting processing (step S601).

Next, the image processing section 3B calculates a mean luminance value of pixel within the segment, while moving the segment of the set size by the set moving amount in the segment image generating processing, and generates a segment image having the calculated mean luminance value (step S602).

Next, the image processing section 3B determines whether or not a change in input of the size and/or the moving amount of the segment has been made by the user, from a result of the input accepting processing (whether or not a request for a change in setting of the size and/or the moving amount of the segment has been made) (step S603). In the case of the change in input of the size and/or the moving amount of the segment having been made (step S603: YES), the image processing section 3B re-sets the size and/or the moving amount of the segment in segment re-setting processing (step S604), and returns the processing to step S602.

On the other hand, when the image processing section 3B determines that the change in input of the size or the moving amount of the segment has not been made by the user (step S603: NO), the image processing section 3B accepts a user's input of a first threshold in the input accepting processing, and sets the first threshold inputted by the user with respect to the labeling processing in first threshold setting processing (step S202). Since subsequent processing are the same as those in FIG. 2 referenced in the description of the first embodiment, the description thereof will not be given.

As thus described, according to the second embodiment of the present invention, while a segment of a size desired by the user is moved in desired pixel units (moving amount), a segment image is generated with a mean luminance value of all pixels within the calculated segment as one pixel value, and processing using the two thresholds is performed on the segment image, so that the detection object has a small area. Even when a plurality of objects are present in block in a prescribed region, the plurality of objects can be detected as one blob, thereby improving the blob determination ability.

Figure 7:
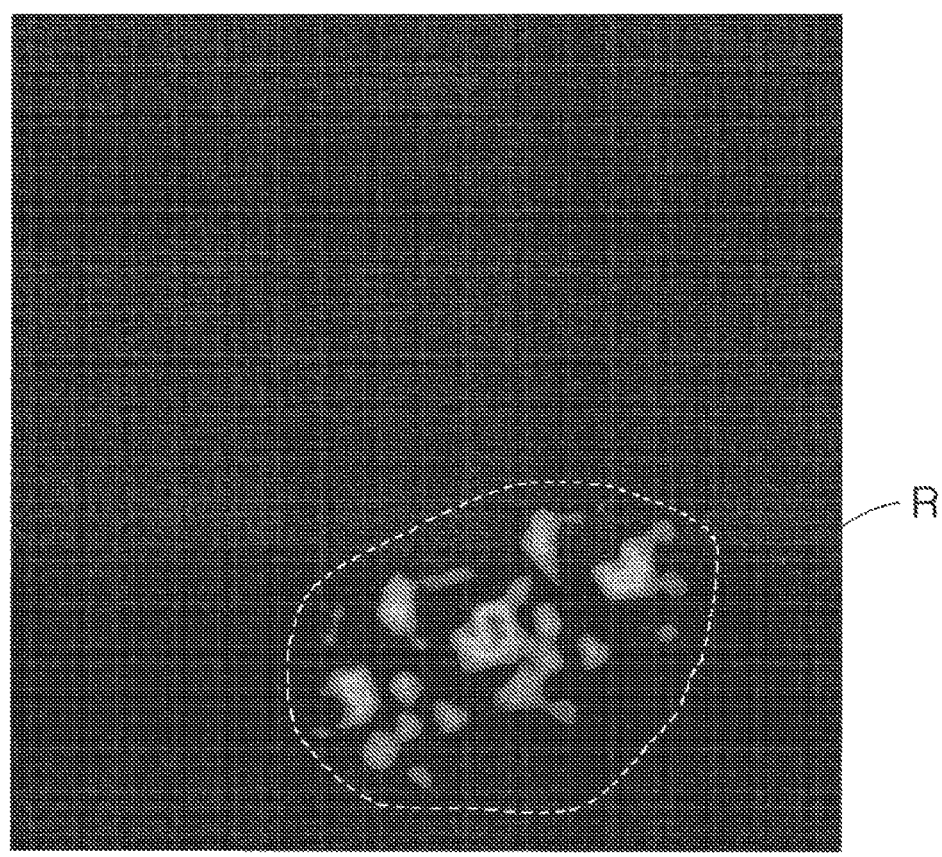
FIG. 7 is a view showing an example of display screens of an original multi-valued image before generation of a segment image according to the second embodiment of the present invention.
Figure 8:
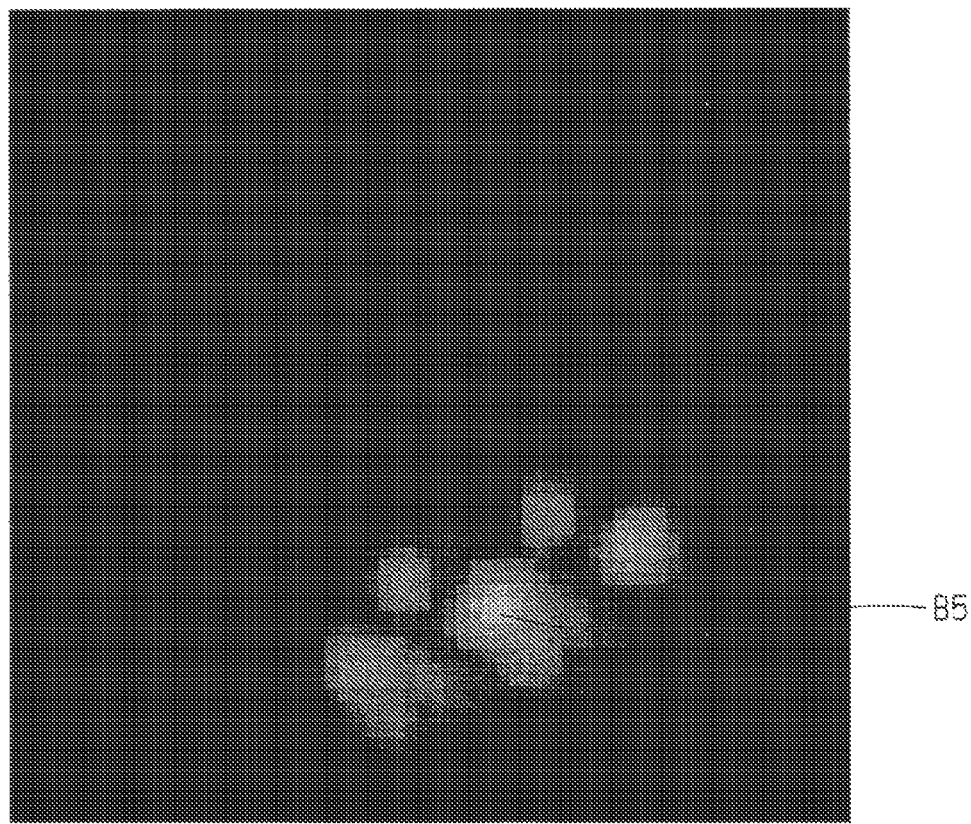
FIG. 8 is a view showing an example of display screens of the segment image according to the second embodiment of the present invention.

FIG. 7 is a view showing an example of display screens of an original multi-valued image before generation of a segment image, and FIG. 8 is a view showing an example of display screens of the segment image. In FIG. 7, the detection object has a small area, and even when a plurality of objects are present in block in a prescribed region It, the plurality of objects can be detected as one blob B5 by generating a segment image as shown in FIG. 8.

It is to be noted that the examples has been described in the first and second embodiments of the present invention in which both the first threshold and the second threshold are inputted by the user, the present invention is not restricted to such a configuration. One threshold may be inputted by the user and the other threshold may be set as a value obtained by adding or deleting a prescribed value.

For example, the user inputs only the first threshold TH1 (Lmin), and the second threshold TH2 (Lmin) is set by the second threshold setting device 33 as a value obtained by adding a prescribed value to the first threshold TH1 (Lmin). Alternatively, the user only inputs the first threshold TH1 (Lmax), and the second threshold TH2 (Lmax) is set by the second threshold setting device 33 as a value obtained by subtracting a prescribed value from the first threshold TH1 (Lmax). Thereby, when the user wishes to detect only a blob having a luminance value difference not smaller than a prescribed value with respect to the freely inputted first threshold, the second threshold is automatically set, which is convenient.

Alternatively, the user inputs only the second threshold TH2 (Lmin), and the first threshold TH1 (Lmin) is set by the first threshold setting device 31 as a value obtained by subtracting a prescribed value from the second threshold TH2 (Lmin). Alternatively, the user only inputs the second threshold TH2 (Lmax), and the first threshold TH1 (Lmax) is set by the first threshold setting device 31 as a value obtained by adding a prescribed value to the second threshold TH2 (Lmax). Thereby, the blob having luminance values smaller than the second threshold TH2 (Lmin) or larger than the second threshold TH2 (Lmax), which was inputted by the user, is detected. When the user wishes to specify and detect the blob by use of the first threshold TH1 (Lmin) decreased from the second threshold TH2 (Lmin) by a prescribed value or by use of the first threshold TH1 (Lmax) increased from the second threshold TH2 (Lmax) by a prescribed value, the first threshold is automatically set, which is convenient.

It is to be noted that the input accepting device 5A and the output device 6 are described as different configurations in the first embodiment of the present invention and the input accepting device 5B and the output device 6 are described as different configurations in the second embodiment of the present invention. However, the present invention is not restricted to such configurations, and the display region of the image display apparatus serving as the output device 6 may be divided and the input accepting devices 5A and 5B may be provided adjacently to the image display region as dialog boxes. Thereby, the image display screen is updated every time the user changes a parameter, such as a first threshold, a second threshold, a size and a moving amount of a segment, upper and lower limits of an area of a blob wished to be detected on the dialog boxes, which can facilitate the user to adjust a necessary parameter while checking the display image after the update.

The image inspection apparatus according to the present invention has an advantage of being capable of reliably removing a noise as a non-detection object and stably detecting a defect such as a scratch or dirt as a detection object, and is used as an inspection apparatus using a defect image in a variety of applications.

What is claimed is:

1. An image inspection apparatus, comprising:
an image pickup device for acquiring a multi-valued image in an inspection object region;
a first threshold setting device for setting as a first threshold a maximum luminance value to be detected in a detection object image;
a labeling processing device for performing labeling processing for extracting a plurality of pixels having luminance values larger than the first threshold from the multi-valued image acquired by the image pickup device, to specify blobs of the pixels based upon connectedness of the luminance values of the extracted plurality of pixels;
a second threshold setting device for setting a second threshold larger than the first threshold with respect to the blobs of the pixels which are specified by the labeling processing device; and
a deletion device for deleting the blob of the pixels which is made up solely of luminance values smaller than the second threshold set by the second threshold setting device.

2. The image inspection apparatus according to claim 1, further comprising
an input accepting device for accepting input of the first threshold and the second threshold.

3. The image inspection apparatus according to claim 2, further comprising:
a segment setting device for setting a segment of a prescribed size with respect to the multi-valued image acquired by the image pickup device; and
a segment image generating device for calculating a mean luminance value of pixels within the segment, while moving the segment set by the segment setting device in prescribed pixel units, to generate a segment image having the calculated mean luminance value and to output the generated image to the labeling processing device.

4. The image inspection apparatus according to claim 3, wherein the prescribed pixel units for the prescribed size and the movement of the segment are accepted in the input accepting device.

5. The image inspection apparatus according to claim 1, further comprising
an input accepting device for accepting input of the first threshold,
wherein the second threshold setting device sets as the second threshold a value obtained by adding a prescribed value to the first threshold.

6. The image inspection apparatus according to claim 1, further comprising
an input accepting device for accepting input of the second threshold,
wherein the first threshold setting device sets as the first threshold a value obtained by subtracting a prescribed value from the second threshold.

7. An image inspection apparatus, comprising:
an image pickup device for acquiring a multi-valued image in an inspection object region;
a first threshold setting device for setting as a first threshold a minimum luminance value to be detected in a detection object image;
a labeling processing device for performing labeling processing for extracting a plurality of pixels having luminance values smaller than the first threshold from the multi-valued image acquired by the image pickup device, to specify blobs of the pixels based upon connectedness of the luminance values of the extracted plurality of pixels;
a second threshold setting device for setting a second threshold smaller than the first threshold with respect to the blobs of the pixels which are specified by the labeling processing device; and
a deletion device for deleting the blob of the pixels which is made up solely of luminance values larger than the second threshold set by the second threshold setting device.

8. The image inspection apparatus according to claim 7, further comprising
an input accepting device for accepting input of the first threshold,
wherein the second threshold setting device sets as the second threshold a value obtained by subtracting a prescribed value from the first threshold.

9. The image inspection apparatus according to claim 7, further comprising
an input accepting device for accepting input of the second threshold,
wherein the first threshold setting device sets as the first threshold a value obtained by adding a prescribed value to the second threshold.

10. An image inspection method, comprising:
an image acquiring process for acquiring a multi-valued image by picking up an image in an inspection object region;
a first threshold setting process for setting as a first threshold a minimum luminance value to be detected in a detection object image;
a labeling processing process for performing labeling processing for extracting a plurality of pixels having luminance values larger than the first threshold from the multi-valued image acquired by the image acquiring process, to specify blobs of the pixels based upon connectedness of the luminance values of the extracted plurality of pixels;
a second threshold setting process for setting a second threshold larger than the first threshold with respect to the blobs of the pixels which are specified by the labeling processing process; and
a deletion process for deleting the blob of the pixels which is made up solely of luminance values smaller than the second threshold set by the second threshold setting process.

11. The image inspection method according to claim 10, further comprising
an input accepting process for accepting input of the first threshold and the second threshold.

12. The image inspection method according to claim 11, further comprising:

a segment setting process for setting a segment of a prescribed size with respect to the multi-valued image acquired by the image acquiring process; and a segment image generating process for calculating a mean luminance value of pixels within the segment, while moving the segment set by the segment setting process in prescribed pixel units, to generate a segment image having the calculated mean luminance value and to output the generated image to the labeling processing process.

13. The image inspection method according to claim 12, wherein the prescribed pixel units for the prescribed size and the movement of the segment are accepted in the input accepting process.

14. The image inspection method according to claim 10, further comprising
an input accepting process for accepting input of the first threshold,
wherein the second threshold setting process sets as the second threshold a value obtained by adding a prescribed value to the first threshold.

15. The image inspection method according to claim 10, further comprising
an input accepting process for accepting input of the second threshold,
wherein the first threshold setting process sets as the first threshold a value obtained by subtracting a prescribed value from the second threshold.

16. An image inspection method, comprising:
an image acquiring process for acquiring a multi-valued image by picking up an image in an inspection object region;
a first threshold setting process for setting as a first threshold a minimum luminance value to be detected in a detection object image;
a labeling processing process for performing labeling processing for extracting a plurality of pixels having luminance values smaller than the first threshold from the multi-valued image acquired by the image acquiring process, to specify blobs of the pixels based upon connectedness of the luminance values of the extracted plurality of pixels;
a second threshold setting process for setting a second threshold smaller than the first threshold with respect to the blobs of the pixels which are specified by the labeling processing process; and
a deletion process for deleting the blob of the pixels which is made up solely of luminance values larger than the second threshold set by the second threshold setting process.

17. The image inspection method according to claim 16, further comprising
an input accepting process for accepting input of the first threshold,
wherein the second threshold setting process sets as the second threshold a value obtained by subtracting a prescribed value from the first threshold.

18. The image inspection method according to claim 16, further comprising
an input accepting process for accepting input of the second threshold,
wherein the first threshold setting process sets as the first threshold a value obtained by adding a prescribed value to the second threshold.

19. A computer program causing a computer to execute:
image acquiring processing for picking up an image in an inspection object region to acquire a multi-valued image;
first threshold setting processing for setting as a first threshold a minimum luminance value to be detected in a detection object image;
labeling processing for extracting a plurality of pixels having luminance values larger than the first threshold from the multi-valued image acquired by the image acquiring processing, to specify blobs of the pixels based upon connectedness of the luminance values of the extracted plurality of pixels;
first determination processing for determining, after the performance of the labeling processing, whether or not a request has been made for a change in setting of the first threshold;
first threshold re-setting processing for re-setting the first threshold upon determination by the first determination processing that the request has been made for a change in setting of the first threshold;
first branch processing for branching the processing to the labeling processing in the case of the first threshold re-setting processing being performed;
second threshold setting processing for setting a second threshold larger than the first threshold with respect to the blobs of the pixels which are specified by the labeling processing;
deletion processing for deleting the blob of the pixels which is made up solely of luminance values smaller than the second threshold set by the second threshold setting processing;
second determination processing for determining, after the performance of the deletion processing, whether or not a request has been made for a change in setting of the second threshold;
second threshold re-setting processing for re-setting the second threshold upon determination by the second determination processing that the request has been made for a change in setting of the second threshold; and
second branch processing for branching the processing to the deletion processing in the case of the second threshold re-setting processing being performed.

20. The computer program according to claim 19,
wherein the computer is caused to execute:
segment setting processing for setting a segment of a prescribed size with respect to the multi-valued image acquired by the image acquiring processing;
segment image generating processing for calculating a mean luminance value of pixels within the segment, while moving the segment set by the segment setting processing in prescribed pixel units, to generate a segment image having the calculated mean luminance value and make the generated image an object for the labeling processing;
third determination processing for determining, after the performance of the segment image generating processing, whether or not a request has been made for a change in setting of the pixel units for the size and/or the movement of the segment;
segment re-setting processing for re-setting the pixel units for the size and/or the movement of the segment upon determination by the third determination processing that the request has been made for a change in setting of the pixel units for the size and/or the movement of the segment; and third branch processing for branching the processing to the segment image generating processing in the case of the segment re-setting processing being performed.

21. A computer program causing a computer to execute:

image acquiring processing for picking up an image in an inspection object region to acquire a multi-valued image;

first threshold setting processing for setting as a first threshold a maximum luminance value to be detected in a detection object image;

labeling processing for extracting a plurality of pixels having luminance values smaller than the first threshold from the multi-valued image acquired by the image acquiring processing, to specify blobs of the pixels based upon connectedness of the luminance values of the extracted plurality of pixels;

first determination processing for determining, after the performance of the labeling processing, whether or not a request has been made for a change in setting of the first threshold;

first threshold re-setting processing for re-setting the first threshold upon determination by the first determination processing that the request has been made for a change in setting of the first threshold;

first branch processing for branching the processing to the labeling processing in the case of the first threshold re-setting processing being performed;

second threshold setting processing for setting a second threshold smaller than the first threshold with respect to the blobs of the pixels which are specified by the labeling processing;

deletion processing for deleting the blob of the pixels which is made up solely of luminance values larger than the second threshold set by the second threshold setting processing;

second determination processing for determining, after the performance of the deletion processing, whether or not a request has been made for a change in setting of the second threshold;

second threshold re-setting processing for re-setting the second threshold upon determination by the second determination processing that the request has been made for a change in setting of the second threshold; and second branch processing for branching the processing to the deletion processing in the case of the second threshold re-setting processing being performed.

* * * * *